US012752817B2

(12) United States Patent
Yamazaki

(10) Patent No.: US 12,752,817 B2
(45) Date of Patent: Oct. 6, 2026

(54) VEHICLE CONTROL APPARATUS

(71) Applicant: TOYOTA JIDOSHA KABUSHIKI KAISHA, Toyota (JP)

(72) Inventor: Masayuki Yamazaki, Yokohama (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 19/260,813

(22) Filed: Jul. 7, 2025

(65) Prior Publication Data

US 2026/0062034 A1 Mar. 5, 2026

(30) Foreign Application Priority Data

Sep. 4, 2024 (JP) ................................ 2024-152358

(51) Int. Cl.

| | |
|---|---|
| ***B60W 60/00*** | (2020.01) |
| ***B60W 40/08*** | (2012.01) |
| ***G06V 20/59*** | (2022.01) |
| ***G06V 40/10*** | (2022.01) |

(52) U.S. Cl.

CPC ........ *B60W 60/0016* (2020.02); *B60W 40/08* (2013.01); *G06V 20/593* (2022.01); *G06V 40/10* (2022.01); *B60W 2040/0881* (2013.01); *B60W 2420/403* (2013.01); *B60W 2540/223* (2020.02)

(58) Field of Classification Search

None

See application file for complete search history.

(56) References Cited

U.S. PATENT DOCUMENTS

2017/0210357 A1* 7/2017 Nagai ........................ B60C 9/00
2019/0265703 A1* 8/2019 Hicok ..................... B60Q 1/507
2020/0130707 A1* 4/2020 Sonntag ............. G01C 21/3453
2021/0016805 A1* 1/2021 Oba ....................... B60W 40/08
2021/0107421 A1* 4/2021 Uno ......................... B60R 11/04
2021/0114600 A1* 4/2021 Uno ........................ G06V 20/52
2021/0237778 A1* 8/2021 Kuranuki ............... B60K 28/02
2024/0280997 A1* 8/2024 Oba ...................... B62D 15/025

FOREIGN PATENT DOCUMENTS

JP 2024-046924 A 4/2024

* cited by examiner

*Primary Examiner* — Daniel L Greene

(74) *Attorney, Agent, or Firm* — Sughrue Mion, PLLC

(57) ABSTRACT

A vehicle control apparatus includes a controller configured to derive reference posture likelihood and immediate posture likelihood at a first time, and calculate a likelihood ratio of the reference posture likelihood to the immediate posture likelihood at the first time, the reference posture likelihood indicating likelihood that posture of an object is a reference posture and the immediate posture likelihood indicating likelihood that the posture of the object is an immediate posture, turn on a flag indicating that the posture of the object is the reference posture in a case in which the reference posture likelihood is equal to or greater than a threshold, and the likelihood ratio is equal to or greater than a first predetermined value, and turn off the flag in a case in which the reference posture likelihood is less than the threshold, or the likelihood ratio is less than the first predetermined value.

7 Claims, 3 Drawing Sheets

VEHICLE CONTROL APPARATUS

CROSS-REFERENCE TO RELATED APPLICATION

This application claims priority to Japanese Patent Application No. 2024-152358 filed on Sep. 4, 2024, the entire contents of which are incorporated herein by reference.

TECHNICAL FIELD

The present disclosure relates to a vehicle control apparatus.

BACKGROUND

Technology for determining the posture of a person based on the posture likelihood, which indicates the likelihood that the posture of the person is a particular posture is known. For example, Patent Literature (PTL) 1 discloses technology for outputting the likelihood of the posture of a person and determining that the posture of the person is a particular posture (e.g., lying posture) if the likelihood is equal to or greater than a threshold.

CITATION LIST

Patent Literature

PTL 1: JP 2024-046924 A

SUMMARY

When posture judgment is used to determine permission to start a vehicle, it is necessary to determine that the posture of the person in the vehicle is a safe posture, e.g., a seating posture. When a seating decision is made by image recognition, the seating posture can be determined based on whether the posture likelihood, which indicates the likelihood that the posture of an object is a particular posture, e.g., the seating likelihood, exceeds a threshold. However, the seating likelihood may increase or decrease due to factors such as the way a person sits, the position of the seat, the internal structure of the vehicle, the brightness at the time of imaging, and variations in the input image signal due to camera performance. Therefore, to accurately determine the seating posture, the threshold needs to be set high. A higher threshold increases the time it takes for the seating likelihood to exceed the threshold, which may stress the passenger. The seating decision is also performed for all persons in the vehicle. Therefore, waiting until everyone's seating likelihood exceeds the threshold may cause additional stress to passengers. On the other hand, a low threshold makes it difficult to accurately determine the seating posture.

It would be helpful to improve technology related to posture determination based on the likelihood of the posture of a person.

A vehicle control apparatus according to an embodiment of the present disclosure includes a controller configured to:

derive, from an image of an object at a first time, reference posture likelihood and immediate posture likelihood at the first time, and calculate a likelihood ratio at the first time, the reference posture likelihood indicating likelihood that posture of the object is a reference posture, the immediate posture likelihood indicating likelihood that the posture of the object is an immediate posture, the likelihood ratio being a ratio of the reference posture likelihood to the immediate posture likelihood, and the immediate posture being a posture that the object is likely to take before or after transitioning to the reference posture;

turn on a flag indicating that the posture of the object is the reference posture in a case in which the reference posture likelihood at the first time is equal to or greater than a threshold, and the likelihood ratio at the first time is equal to or greater than a first predetermined value; and turn off the flag in a case in which the reference posture likelihood at the first time is less than the threshold, or the likelihood ratio at the first time is less than the first predetermined value.

According to an embodiment of the present disclosure, technology related to posture determination based on the likelihood of the posture of a person is improved.

DETAILED DESCRIPTION

An embodiment of the present disclosure will be described below, with reference to the drawings.

Outline of the Present Embodiment

Figure 1:
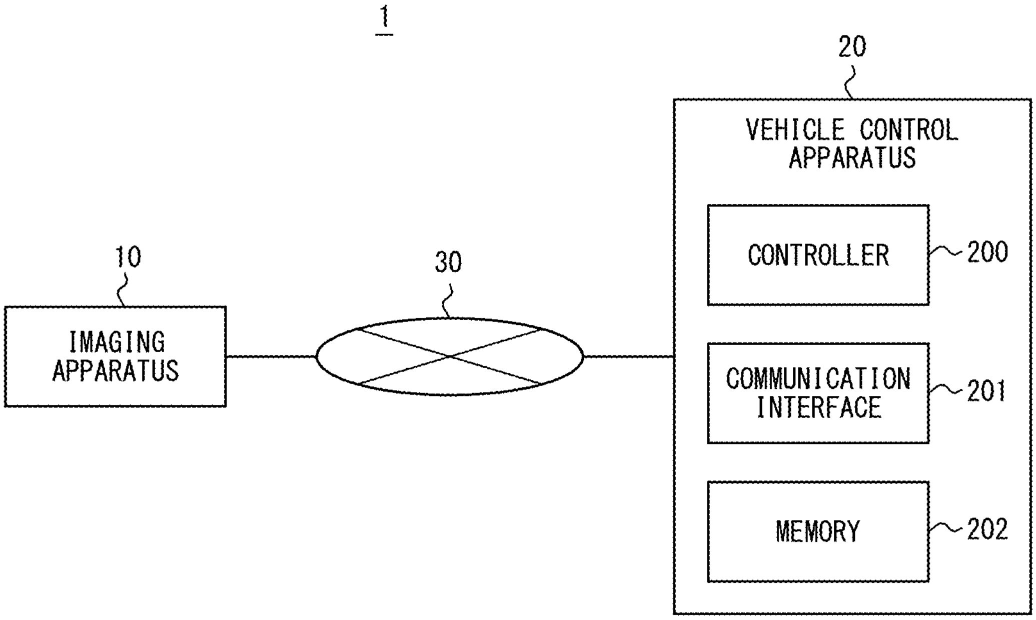
FIG. 1 is a block diagram illustrating a schematic configuration of a vehicle control system according to the present embodiment.

An outline of a vehicle control system 1 according to the present embodiment will be described with reference to FIG. 1. The vehicle control system 1 is equipped with an imaging apparatus 10 and a vehicle control apparatus 20. The imaging apparatus 10 and the vehicle control apparatus 20 are connected to each other communicably through a network 30 that includes, for example, the Internet and mobile communication networks.

The imaging apparatus 10 is at least one in-vehicle camera. The imaging apparatus 10 captures images of the seats and objects near the seats in the vehicle while the vehicle is temporarily stopped.

A vehicle is any vehicle capable of carrying one or more passengers, e.g., an automobile, bus or shuttle bus. Entrances and seating may be located in different positions. In the present embodiment, a vehicle is an automated driving vehicle capable of automated operation at levels 1 to 5 as defined in the Society of Automotive Engineers (SAE). The vehicle may be a manually operated vehicle where the relevant level is 0. The vehicle may be remotely monitored by an observer outside the vehicle. The vehicle may be a MaaS-dedicated vehicle. The term "MaaS" is an abbreviation of Mobility as a Service.

The vehicle control apparatus 20 is an electronic device, e.g., a computer, installed in the vehicle. The vehicle control apparatus 20 detects objects from images captured by the imaging apparatus 10 using any object detection technique. The image may be a still or moving image. The object is the person in the vehicle. The vehicle control apparatus 20 uses any posture estimation technique, e.g., machine learning, to derive posture likelihood, which indicates the likelihood that the posture of the object is a particular posture, from the image. The vehicle control apparatus 20 uses the multiple posture likelihoods to estimate the posture of the object and, based on the results of the estimation, decides whether to permit the vehicle to start.

First, an outline of the present embodiment will be described, and details thereof will be described later. The vehicle control apparatus according to the present embodiment is equipped with a controller. The controller derives, from an image of an object at a first time, reference posture likelihood and immediate posture likelihood at the first time, and calculates a likelihood ratio at the first time, the reference posture likelihood indicating likelihood that posture of the object is a reference posture, the immediate posture likelihood indicating likelihood that the posture of the object is an immediate posture, the likelihood ratio being a ratio of the reference posture likelihood to the immediate posture likelihood. The immediate posture is a posture that the object is likely to take before or after transitioning to the reference posture. The controller turns on a flag indicating that the posture of the object is the reference posture if the reference posture likelihood at the first time is equal to or greater than a threshold, and the likelihood ratio at the first time is equal to or greater than a first predetermined value. The controller turns off the flag if the reference posture likelihood at the first time is less than the threshold, or the likelihood ratio at the first time is less than the first predetermined value.

Due to differences in sitting posture and other factors, it may be easier for some people to determine the immediate posture than the reference posture (seating posture). In the present embodiment, the seating posture can be accurately determined by comparing the seating likelihood with the likelihood of the immediate posture, even in situations where it is difficult to determine seating using only the seating likelihood, i.e., when the seating likelihood is less than a predetermined threshold. This reduces the time required for the seating decision and lowers passenger stress.

The reduced time required for the seating decision is useful for driverless automated driving vehicles. Such vehicles are remotely monitored, for example, by a monitor in the base station. If the vehicle does not start immediately, passengers in the vehicle may assume that trouble has occurred and may communicate with the watchman to ask him to fix the problem. Increased frequency of communication between passengers and monitors may lead to an increased workload for the monitors. Such a burden on the observer may be further increased if a single observer monitors multiple automated driving vehicles. The vehicle control apparatus according to the present embodiment can reduce the time required for the seating decision and thereby reduce the burden on such monitors.

The use of multiple cameras or other sensors to increase the accuracy of seating decisions increases the cost of seating decisions. By using the likelihood of the reference posture and the immediate posture derived from a single image, the vehicle control apparatus according to the present embodiment can reduce the number of cameras or other sensors required and reduce the cost of the seating decision.

Thus, the present embodiment improves technology related to posture determination based on the likelihood of the posture of a person.

Next, each component of the vehicle control system 1 is described.

(Configuration of Imaging Apparatus 10)

The imaging apparatus 10 is any imaging module that is installed in the vehicle and capable of imaging all seats and objects in the vehicle. The imaging module includes one or more cameras. In the present embodiment, the imaging apparatus 10 is a single camera that is installed on the ceiling near the entrance of the vehicle. The imaging apparatus 10 may be two cameras installed at different locations, e.g., on the ceiling in the center and rear of the vehicle. The imaging apparatus 10 may be a 180-degree or 360-degree camera. The imaging apparatus 10 transmits the captured images to the vehicle control apparatus 20 via the network 30.

(Vehicle Control Apparatus 20)

The vehicle control apparatus 20 includes a controller 200, a communication interface 201, and a memory 202.

The controller 200 includes at least one processor, at least one programmable circuit, at least one dedicated circuit, or a combination of these. The controller 200 controls the operations of the vehicle control apparatus 20.

The communication interface 201 includes at least one interface for communication for connecting to the network 30. The communication interface supports, for example, mobile communication standards such as 4G or 5G, V2X communication standards such as DSRC or cellular V2X, or wireless LAN communication standards such as IEEE802.11. The term "4G" is an abbreviation of 4th generation. The term "5G" is an abbreviation of 5th generation. The term "DSRC" is an abbreviation of dedicated short range communications. The term "V2X" is an abbreviation of vehicle-to-everything. The term "IEEE" is an abbreviation of Institute of Electrical and Electronics Engineers.

The memory 202 includes one or more memories. The memories included in the memory 202 may each function as, for example, a main memory, an auxiliary memory, or a cache memory. The memory 202 stores any information used for operations of the vehicle control apparatus 20. For example, the memory 202 stores system programs, application programs, embedded software, and any data used for object detection and posture estimation. The memory 202 may store information on the position and shape of each seat, or models of postures used for seating estimation, e.g., reference posture and the immediate posture, in advance. These models may be generated by machine learning. The information stored in the memory 202 may be updated by the controller 200. In the present embodiment, a flag indicating that the posture of the object is a seating posture is stored in the memory 202 and also updated by the controller 200.

(Posture Likelihood)

Next, the posture likelihood is explained. The posture likelihood indicates the likelihood that the posture of the object is a particular posture. The controller 200 of the vehicle control apparatus 20 derives the reference posture likelihood, which indicates the likelihood that the posture of the object is the reference posture, and the immediate posture likelihood, which indicates the likelihood that the posture of the object is the immediate posture. The immediate posture is a posture that the object is likely to take before or after transitioning to the reference posture. The immediate posture in the seating decision includes a half-crouching posture, an upstanding posture, a walking posture, or a crouching posture. In the present embodiment, the reference posture is the seating posture and the immediate posture is the half-crouching posture. The seating posture is the posture the object is in when seated in a seat. The half-crouching posture is a crouching posture just before the object is seated in the seat. The upstanding posture is the posture in which the object is upstanding. The walking posture is the posture while the object is walking. The crouching posture is the posture in which the object crouches on the floor or on a seat.

Figure 2:
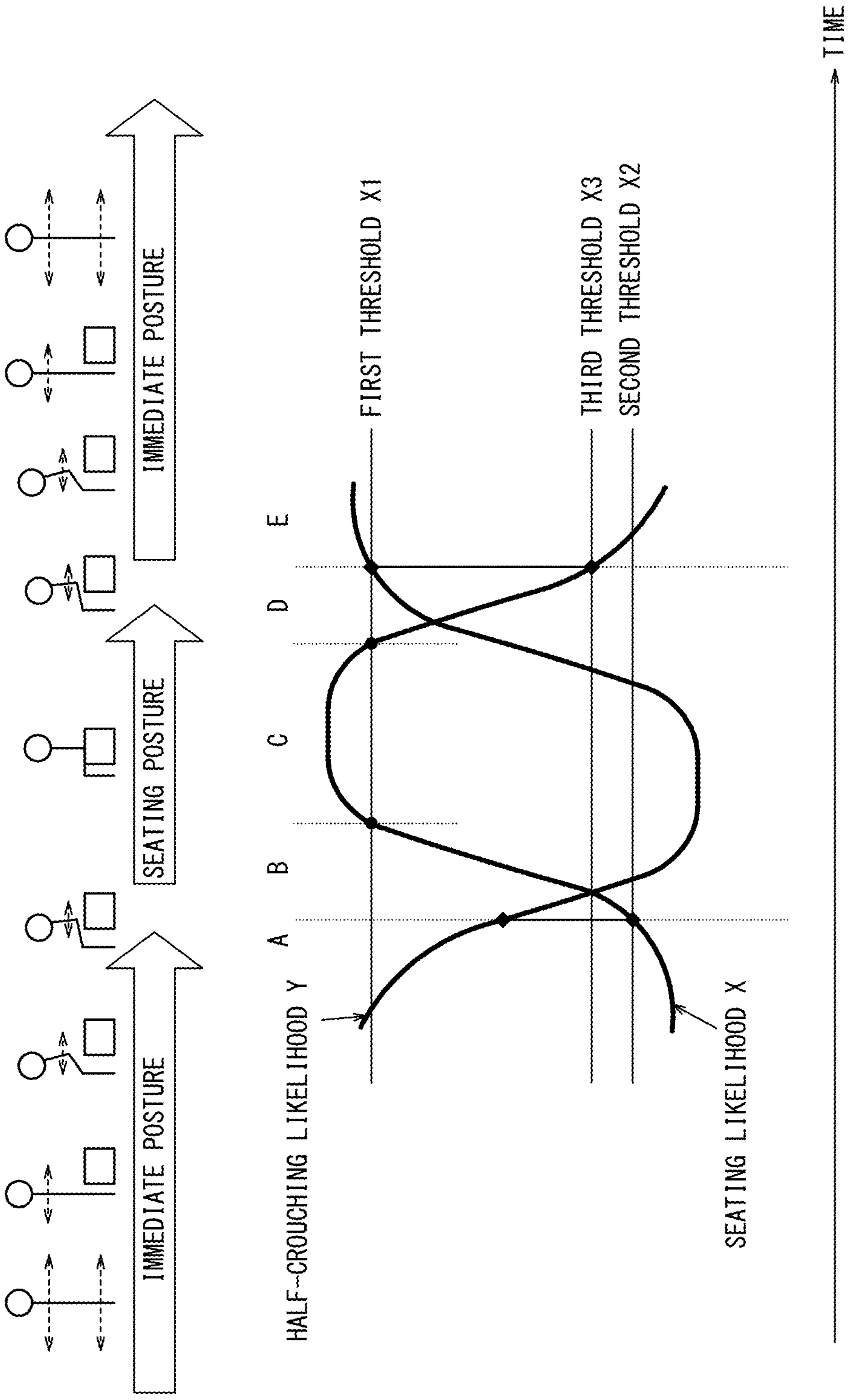
FIG. 2 is a schematic diagram illustrating an exemplary time variation of posture and posture likelihood before and after an object transitions to a seating posture.

An exemplary time variation of the posture and posture likelihood before and after the object transitions to the seating posture will be described with reference to FIG. 2. The upper side of FIG. 2 indicates the change in the posture of the object. In FIG. 2, the posture of the object transitions from the immediate posture to the seating posture and then back to the immediate posture. Changes in the posture of the object are classified by states A to E. In state A, the posture of the object is the immediate posture, transitioning from a walking posture to a upstanding posture and then to a half-crouching posture. In state B, the posture of the object is gradually transitioning from the immediate posture (half-crouching posture) to the seating posture. In state C, the posture of the object is a seating posture. In state D, the posture of the object gradually transitions from the seating posture to the immediate posture. In state E, the posture of the object is the immediate posture, transitioning from a half-crouching posture to an upstanding posture and then to a walking posture.

The lower part of FIG. 2 illustrates the change in seating likelihood X and half-crouching likelihood Y. In state A, the seating likelihood X is less than the second threshold X2 and the half-crouching likelihood Y is higher than the seating likelihood X. In state B, the seating likelihood X is equal to or greater than the second threshold X2 and less than the first threshold X1, and as the posture changes, the seating likelihood X increases while the half-crouching likelihood Y decreases, and the seating likelihood X is higher than the half-crouching likelihood Y. In state C, the seating likelihood X is equal to or greater than the first threshold X1, the seating likelihood X reaches its highest value, and the half-crouching likelihood Y reaches its lowest value. In state D, the seating likelihood X is equal to or greater than the third threshold X3 and less than the first threshold X1, and as the posture changes, the seating likelihood X decreases while the half-crouching likelihood Y increases, and the half-crouching likelihood Y is higher than the seating likelihood X. In state E, the seating likelihood X is less than the third threshold X3 and the half-crouching likelihood Y is higher than the seating likelihood X. The first threshold X1 is set higher than the second threshold X2 and the third threshold X3. The second threshold X2 is set higher than the third threshold X3 in FIG. 2, but may be set equal to or less than the third threshold X3.

Although not illustrated in FIG. 2, the walking posture, the upstanding posture and the half-crouching posture reach their maximum values in the order of the walking posture, the upstanding posture and the half-crouching posture in state A, and in the reverse order in state E.

In states B and D, the boundary between the seating posture and the half-crouching posture is ambiguous, making it difficult to perform an accurate seating decision using only the seating likelihood. By using the seating likelihood and the half-crouching likelihood, the vehicle control apparatus 20 for the present embodiment can accurately perform the seating decision even in states B and D.

The posture of the object may change so that it differs from FIG. 2. For example, if the object is a child, the posture of the object may transition from a crouching posture to a seating posture via a half-crouching posture, and then back to a crouching posture in the reverse order. The likelihood of these postures reaches a maximum value in the order of a crouching posture, a half-crouching posture, a seating posture, a half-crouching posture, and a crouching posture.

(Flow of Operations of Controller 200)

Figure 3:
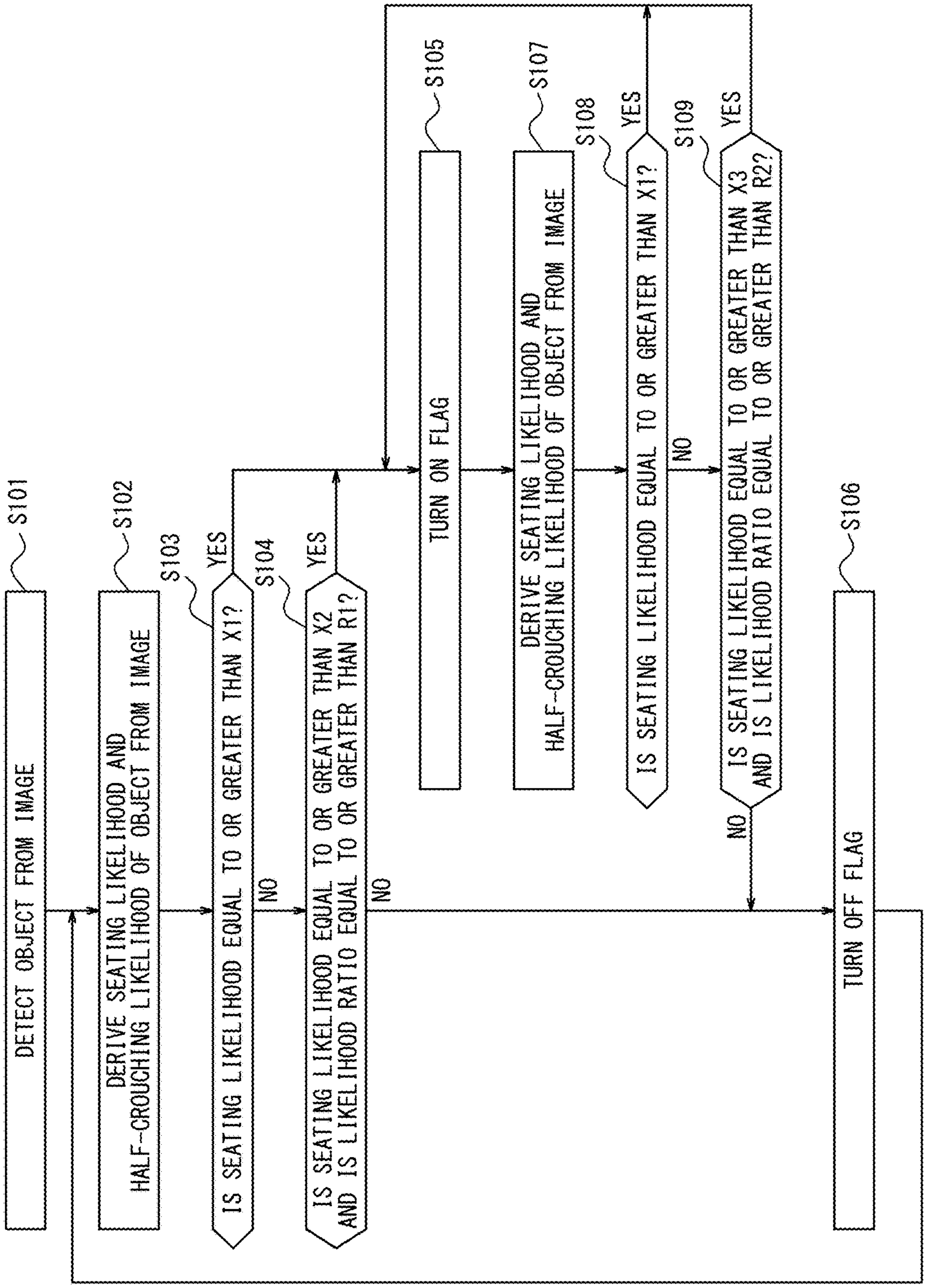
FIG. 3 is a flowchart illustrating operations of a vehicle control apparatus according to the present embodiment.

Referring to FIG. 3, operations of the controller 200 in the vehicle control apparatus 20 according to the present embodiment will be described. The controller 200 performs the following S101 to S106 while the vehicle is temporarily stopped at a stop, for example. In S101 to S106, the controller 200 determines whether the posture of the object has transitioned to the seating posture. The flag indicating that the posture of the object is a seating posture is initially set to off.

S101: The controller 200 detects the object from the image at the first time.

The first time is the time when the imaging apparatus 10 captured images of the seat and objects near the seat while the vehicle was stopped. The controller 200 receives the images captured at the first time from the imaging apparatus 10 via the communication interface 201. The controller 200 detects the object from the image at the first time using any object detection technique.

S102: The controller 200 derives the seating likelihood and the half-crouching likelihood at the first time from the image of the object at the first time and also calculates the likelihood ratio at the first time.

The likelihood ratio is the ratio of the reference posture likelihood to the immediate posture likelihood and is expressed in the form of the formula $R=X/Y$. Here, R is the likelihood ratio, X is the reference posture likelihood, and Y is the immediate posture likelihood. In the present embodiment, the reference posture likelihood is the seating likelihood and the immediate posture likelihood is the half-crouching likelihood.

S103: The controller 200 determines whether the seating likelihood is equal to or greater than the first threshold X1. If the seating likelihood is determined to be equal to or greater than the first threshold X1 (S103—YES), the process proceeds to S105. If not (S103—NO), the process proceeds to S104.

S104: The controller 200 determines whether the seating likelihood at the first time is equal to or greater than the second threshold X2 and the likelihood ratio at the first time is equal to or greater than the first predetermined value R1. If it is determined that the seating likelihood at the first time is equal to or greater than the second threshold X2 and the likelihood ratio at the first time is equal to or greater than the first predetermined value R1 (S104—YES), the process proceeds to S105. If not (S104—NO), the process proceeds to S106.

S103 to S104 correspond to the seating decisions in states A to C of FIG. 2. The controller 200 does not have to perform the judgment in S103. In S104, the controller 200 does not have to perform the determination of whether the seating likelihood at the first time is equal to or greater than the second threshold X2.

S105: The controller 200 turns on the flag. If the flag is already on, the controller 200 does nothing.

S106: The controller 200 turns off the flag. The process then returns to S102.

The controller 200 repeats S102 to S106 until the flag is turned on.

The controller 200 executes the process of S101 to S106 for each object in the vehicle. If the flag is turned on for all objects in the vehicle, the controller 200 permits the vehicle to start. If the flag is turned off for one or more objects, the controller 200 does not permit the vehicle to start.

The controller 200 performs the following S107 to S109 while the vehicle is stopped again, for example, by a pedestrian crossing or traffic signal, after the flag is turned on in S106 and the vehicle is started. In S107 to S109, the controller 200 determines whether the posture of the object has changed from the seating posture.

S107: The controller 200 derives the seating likelihood and the half-crouching likelihood at the second time from the image at the second time, and also calculates the likelihood ratio at the second time.

The second time is the time after the flag is turned on in S105 and the vehicle is started. In the present embodiment, the second time is the time when the imaging apparatus 10 captures images of the seat and objects near the seat while the vehicle is stopped again after the flag is turned on in S105 and the vehicle is started. The controller 200 receives the image taken at the second time from the imaging apparatus 10 via the communication interface 201.

S108: The controller 200 determines whether the seating likelihood at the second time is equal to or greater than the first threshold X1. If the seating likelihood at the second time is determined to be equal to or greater than the first threshold X1 (S108—YES), the process returns to S105. If the seating likelihood is determined to be less than the first threshold X1 (S108—NO), the process proceeds to S109.

S109: The controller 200 determines whether the seating likelihood at the second time is equal to or greater than the third threshold X3 and whether the likelihood ratio at the second time is equal to or greater than the second predetermined value R2. If it is determined that the seating likelihood at the second time is equal to or greater than the third threshold X3 and the likelihood ratio at the second time is equal to or greater than the second predetermined value R2 (S109—YES), the process returns to S105. Otherwise (S109—NO), the process returns to S106.

S108 to S109 correspond to the seating decisions in states C to E of FIG. 2. The controller 200 does not have to perform the determination in S108. In S109, the controller 200 does not have to perform the determination of whether the seating likelihood at the second time is equal to or greater than the third threshold X3. If the process returns from S108 or S109 to S106, the controller 200 executes S102 to S106 again.

The controller 200 executes S107 to S109 for each object in the vehicle. If the flag is turned on for all objects, the controller 200 permits the vehicle to start. If the flag is turned off for one or more objects, the controller 200 does not permit the vehicle to start. The controller 200 executes S107 to S109 each time the vehicle stops.

In another embodiment, in S102, S104, S107 and S109, the immediate posture may be an upstanding posture, a walking posture or a crouching posture. In another embodiment, in S102 and S107, the controller 200 may derive the likelihoods of the half-crouching posture, the upstanding posture, the walking posture, and the crouching posture and calculate each likelihood ratio based on each posture likelihood. In S104, the controller 200 may turn on the flag if the seating likelihood at the first time is equal to or greater than the second threshold X2 and at least one of these likelihood ratios at the first time is equal to or greater than the first predetermined value R1, otherwise, may turn off the flag. In S108, the controller 200 may turn on the flag if the seating likelihood at the second time is equal to or greater than the second threshold X2 and at least one of these likelihood ratios at the second time is equal to or greater than the second predetermined value R2, otherwise, may turn off the flag. If the behavior of the object is quick, the determination of half-crouching posture may fail to derive the half-crouching likelihood. In this other embodiment, even if the derivation of one immediate posture likelihood fails, other nearest neighbor likelihoods can be derived to perform the seating decision.

The second predetermined value R2 may be different from the first predetermined value R1. If the time for the seating decision is limited, e.g., if the vehicle is stopped near a crosswalk or traffic light, the time for the seating decision should be reduced. Therefore, the second predetermined value R2 may be lower than the first predetermined value R1.

The first predetermined value R1 and the second predetermined value R2 may be set to be different for each posture at the immediate posture. When the object is seated, as illustrated on the upper side of FIG. 2, the posture of the object transitions to the seating posture in the order of the walking posture, the upstanding posture, and the half-crouching posture, and the safety of the object increases in this order. Therefore, to increase the safety of the object, the first predetermined value R1 may be set to increase in the order of half-crouching likelihood, upstanding likelihood, and walking likelihood.

The first predetermined value R1 and the second predetermined value R2 may be set differently depending on the orientation of the object (person) relative to the camera. It is more difficult to grasp the characteristic points of a posture of the person from the front than it is to grasp said characteristic points from the side. For example, a person stands upright in the upstanding posture, whereas in the walking posture, the legs move forward in relation to the torso. Differences in the upstanding posture and the walking posture are more difficult to ascertain when a person is viewed from the front than when a person is viewed from the side. Therefore, the first predetermined value R1 and the second predetermined value R2 may be set below the first predetermined value R1 and the second predetermined value R2 when the object is facing frontal to the camera and the subject is facing sideways to the camera. The "frontal direction" is the direction from the object to the camera and the direction that is inclined within a range of greater than 0 degrees and less than 30 degrees from that direction. The "lateral direction" is the direction that is inclined between 30 and 150 degrees toward the camera from the object.

Table 1 illustrates examples of the first predetermined value R1 and the second predetermined values R2 when the object is facing frontal to the camera. Table 2 illustrates examples of the first predetermined value R1 and the second predetermined value R2 when the object is facing sideways to the camera.

TABLE 1

| Posture (frontal direction) | Half-crouching posture | Upstanding posture | Walking posture | Crouching posture |
|---|---|---|---|---|
| First predetermined value R1 | 4 | 8 | 10 | 12 |
| Second predetermined value R2 | 1/4 | 1/8 | 1/12 | 1/15 |

TABLE 2

| Posture (lateral direction) | Half-crouching posture | Upstanding posture | Walking posture | Crouching posture |
|---|---|---|---|---|
| First predetermined value R1 | 4 | 20 | 40 | 100 |
| Second predetermined value R2 | 1/4 | 1/20 | 1/40 | 1/100 |

To perform the seating decisions in S104 and S109 more quickly, the likelihood ratio may be defined as the formula $R=(X+\alpha)/Y$. Here, R is the likelihood ratio, X is the reference posture likelihood, Y is the immediate posture likelihood, and a is any constant equal to or greater than 0. As $\alpha$ increases, the time it takes for the likelihood ratio to exceed the first predetermined value R1 or the second predetermined value R2 decreases. Table 3 illustrates examples of $\alpha$ when the object is facing frontal or sideways to the camera.

TABLE 3

| Posture | Half-crouching posture | Upstanding posture | Walking posture | Crouching posture |
|---|---|---|---|---|
| $\alpha$ (frontal direction) | 0.2 | 0.1 | 0.1 | 0.01 |
| $\alpha$ (lateral direction) | 0.1 | 0.001 | 0.001 | 0.00001 |

To increase the safety of the object, a may be set to increase in the order of half-crouching likelihood, upstanding likelihood, and walking likelihood, as illustrated in Table 3.

As described above, the vehicle control apparatus according to the present embodiment is equipped with a controller. The controller derives, from an image of an object at a first time, reference posture likelihood and immediate posture likelihood at the first time, and calculates a likelihood ratio at the first time, the reference posture likelihood indicating likelihood that posture of the object is a reference posture, the immediate posture likelihood indicating likelihood that the posture of the object is an immediate posture, the likelihood ratio being a ratio of the reference posture likelihood to the immediate posture likelihood. The immediate posture is a posture that the object is likely to take before or after transitioning to the reference posture. The controller turns on a flag indicating that the posture of the object is the reference posture if the reference posture likelihood at the first time is equal to or greater than a threshold R1, and the likelihood ratio at the first time is equal to or greater than a first predetermined value. The controller turns off the flag if the reference posture likelihood at the first time is less than the threshold, or the likelihood ratio at the first time is less than the first predetermined value R1.

Due to differences in sitting posture and other factors, it may be easier for some people to determine the immediate posture than the reference posture (seating posture). According to such a configuration, even in a situation where it is difficult to determine seating using only the seating likelihood, i.e., the seating likelihood is less than a predetermined threshold, the seating posture can be accurately determined by comparing the seating likelihood with the likelihood of the immediate posture. This reduces the time required for the seating decision and lowers passenger stress.

The reduced time required for the seating decision is useful for driverless automated driving vehicles. Such vehicles are remotely monitored, for example, by a monitor in the base station. If the vehicle does not start immediately, a passenger in the vehicle may think there is a problem and communicate with the watchman to ask him to fix the problem. Increased frequency of communication between passengers and monitors may lead to an increased workload for the monitors. Such a burden on the observer may be further increased if a single observer monitors multiple automated driving vehicles. The vehicle control apparatus according to the present embodiment can reduce the burden on such monitors by decreasing the time required for the seating decision.

The use of multiple cameras or other sensors to increase the accuracy of seating decisions increases the cost of seating decisions. By using the likelihood of the reference posture and the immediate posture derived from a single image, the vehicle control apparatus according to the present embodiment can reduce the number of cameras or other sensors required and reduce the cost of the seating decision.

While the present disclosure has been described with reference to the drawings and examples, it will be understood that various modifications and revisions may be implemented by those skilled in the art based on the present disclosure. Accordingly, such modifications and revisions are included within the scope of the present disclosure.

The plurality of values described in the above embodiments and their major/minor relationships may be modified as appropriate. In the present embodiment, the seating decision is based on the likelihood ratio in S104 and S109. In another embodiment, the seating decision may be based on the likelihood difference, which is the difference between the reference posture likelihood and the previous posture likelihood.

Functions or the like contained in each component, each step, or the like can be rearranged without logical inconsistency, and a plurality of components, steps, or the like can be combined into one or a single component, step, or the like can be divided. For example, an embodiment in which the configuration and operations of the vehicle control apparatus 20 in the above embodiment are distributed to multiple computers capable of communicating with each other can be implemented. In the embodiment described above, it is also possible to have the imaging apparatus 10 and part or all of the vehicle control apparatus 20 in the same apparatus.

The invention claimed is:

1. A vehicle control apparatus comprising a controller configured to:

derive, from an image of an object at a first time, reference posture likelihood and immediate posture likelihood at the first time, and calculate a likelihood ratio at the first time, the reference posture likelihood indicating likelihood that posture of the object is a reference posture, the immediate posture likelihood indicating likelihood that the posture of the object is an immediate posture, the likelihood ratio being a ratio of the reference posture likelihood to the immediate posture likelihood, and the immediate posture being a posture that the object is likely to take before or after transitioning to the reference posture;

turn on a flag indicating that the posture of the object is the reference posture in a case in which the reference posture likelihood at the first time is equal to or greater than a threshold, and the likelihood ratio at the first time is equal to or greater than a first predetermined value; and turn off the flag in a case in which the reference posture likelihood at the first time is less than the threshold, or the likelihood ratio at the first time is less than the first predetermined value.

2. The vehicle control apparatus according to claim 1, wherein the controller is configured to:

derive, from an image of the object at a second time after the flag is turned on, reference posture likelihood and immediate posture likelihood at the second time, and calculate a likelihood ratio at the second time; and turn off the flag in a case in which the reference posture likelihood at the second time is less than a threshold, or the likelihood ratio at the second time is less than a second predetermined value.

3. The vehicle control apparatus according to claim 2, wherein the second predetermined value is lower than the first predetermined value.

4. The vehicle control apparatus according to claim 1, wherein the reference posture is a seating posture, and the immediate posture is a half-crouching posture, an upstanding posture, a walking posture, or a crouching posture.

5. The vehicle control apparatus according to claim 1, wherein the controller is configured to:

permit a vehicle to start in a case in which the flag is on; and not permit the vehicle to start in a case in the flag is off.

6. The vehicle control apparatus according to claim 1, wherein a vehicle is an automated driving vehicle.

7. A method, by a processor, for improving travel mobility as a service (MaaS), comprising processing steps executed by the vehicle control apparatus according to claim 1.

* * * * *